United States Patent
Halfmann et al.

(10) Patent No.: US 8,636,470 B2
(45) Date of Patent: Jan. 28, 2014

(54) TURBINE BLADES AND TURBINE ROTOR ASSEMBLIES

(75) Inventors: Steve Halfmann, Chandler, AZ (US); Mark C. Morris, Phoenix, AZ (US)

(73) Assignee: Honeywell International Inc., Morristown, NJ (US)

(*) Notice: Subject to any disclaimer, the term of this patent is extended or adjusted under 35 U.S.C. 154(b) by 494 days.

(21) Appl. No.: 12/903,763

(22) Filed: Oct. 13, 2010

(65) Prior Publication Data

US 2012/0093649 A1   Apr. 19, 2012

(51) Int. Cl.
  *F01D 5/08*   (2006.01)

(52) U.S. Cl.
  USPC ..................... 416/97 R; 416/193 A (58) Field of Classification Search
  USPC ...... 416/97 R, 90 R, 91, 95, 179, 193 A, 232; 415/115, 116, 173.7
  See application file for complete search history.

(56) References Cited

U.S. PATENT DOCUMENTS

| | | | |
|---|---|---|---|
| 2,978,168 A * | 4/1961 | Haworth | 416/92 |
| 3,017,159 A * | 1/1962 | Foster et al. | 416/90 R |
| 3,834,831 A * | 9/1974 | Mitchell | 416/95 |
| 5,135,354 A * | 8/1992 | Novotny | 415/115 |
| 5,639,216 A | 6/1997 | McLaurin et al. | |
| 5,848,876 A | 12/1998 | Tomita | |
| 6,071,075 A | 6/2000 | Tomita et al. | |
| 6,079,946 A | 6/2000 | Suenaga et al. | |
| 6,120,249 A * | 9/2000 | Hultgren et al. | 416/97 R |
| 6,196,799 B1 | 3/2001 | Fukue et al. | |
| 6,641,360 B2 | 11/2003 | Beeck et al. | |
| 7,097,424 B2 | 8/2006 | Cunha et al. | |
| 7,416,391 B2 * | 8/2008 | Veltre et al. | 416/97 R |
| 7,600,972 B2 | 10/2009 | Benjamin et al. | |
| 7,610,946 B2 | 11/2009 | Morris et al. | |
| 7,695,247 B1 | 4/2010 | Liang | |
| 2001/0019696 A1 * | 9/2001 | Jones | 416/1 |
| 2005/0058545 A1 * | 3/2005 | Cardenas | 416/97 R |
| 2006/0024163 A1 | 2/2006 | Keith et al. | |
| 2007/0020100 A1 * | 1/2007 | Beeck et al. | 416/193 A |
| 2008/0240927 A1 | 10/2008 | Bergander et al. | |

* cited by examiner

*Primary Examiner* — Nathaniel Wiehe
*Assistant Examiner* — Aaron Jagoda
(74) *Attorney, Agent, or Firm* — Ingrassia Fisher & Lorenz, P.C.

(57) ABSTRACT

A turbine blade includes an airfoil defined by a convex suction side wall, a concave pressure side wall, a leading edge, a trailing edge, a root, and a tip, the walls and the tip each including an interior surface that defines an interior with the root, the interior including an airfoil cooling circuit for directing airflow through the blade, and a platform supporting the airfoil and having a leading side edge, a trailing side edge, suction side edge, a pressure side edge, an airfoil-facing wall, and a root-facing wall, the platform including a platform cooling circuit having an inlet on the leading side edge and an outlet. The turbine blade may be included in a turbine rotor assembly.

19 Claims, 7 Drawing Sheets

TURBINE BLADES AND TURBINE ROTOR ASSEMBLIES

TECHNICAL FIELD

The inventive subject matter described herein generally relates to turbine rotor assemblies, and more particularly relates to turbine blades for use in turbine rotor assemblies.

BACKGROUND

Gas turbine engines, such as turbofan gas turbine engines, may be used to power various types of vehicles and systems, such as, for example, aircraft. Typically, these engines include turbine blades that are impinged on by high-energy compressed air that causes a turbine of the engine to rotate at a high speed. Consequently, the blades are subjected to high heat and stress loadings which, over time, may reduce their structural integrity.

To improve blade structural integrity, a blade cooling scheme is typically incorporated into the turbines. The blade cooling scheme directs cooling air through an internal cooling circuit formed in the blade to maintain blade temperatures within acceptable limits. The internal cooling circuit may include a simple channel extending through a length of the blade or may consist of a series of connected, serpentine cooling passages, which incorporate raised or depressed structures therein. The serpentine cooling passages increase the cooling effectiveness by extending the length of the air flow path. In this regard, the blade may have multiple internal walls that form the intricate cooling passages through which the cooling air flows. The cooling passages then direct the cooling air to openings on a tip and a trailing edge of the blade.

As the desire for increased engine efficiency continues to rise, engine components are increasingly being subjected to higher and higher operating temperatures. For example, newer engine designs may employ operating temperatures that are about 150° C. higher than conventional operating temperatures. However, current engine components, such as the blades, may not be as efficiently designed as desired. For example, certain portions of the blade, such as a platform of the blade, draw cooling air from the internal cooling circuit. However, bleeding cooling air from the internal cooling circuit can increase pressure loss. Additionally, in an event in which a structure of the internal cooling circuit is compromised, platform cooling may be adversely affected.

Accordingly, it is desirable to have an improved system for cooling a blade. In addition, it is desirable to for the improved system to adequately cool the blade platform with minimal pressure loss. Furthermore, other desirable features and characteristics of the inventive subject matter will become apparent from the subsequent detailed description of the inventive subject matter and the appended claims, taken in conjunction with the accompanying drawings and this background of the inventive subject matter.

BRIEF SUMMARY

In an embodiment, by way of example only, a turbine rotor assembly includes a rotor, a blade extending from the rotor, and a seal plate. The blade includes an airfoil defined by a convex suction side wall, a concave pressure side wall, a leading edge, a trailing edge, a root, and a tip, the walls and the tip each including an interior surface that defines an interior with the root, the interior including an airfoil cooling circuit for directing airflow through the blade, and a platform supporting the airfoil and having a leading side edge, a trailing side edge, suction side edge, a pressure side edge, an airfoil-facing wall, and a root-facing wall, the platform including a platform cooling circuit having an inlet on the leading side edge and an outlet. The seal plate is disposed adjacent to the rotor to form a cool air cavity for directing cool air to the cooling hole.

In another embodiment, by way of example only, a turbine blade includes an airfoil defined by a convex suction side wall, a concave pressure side wall, a leading edge, a trailing edge, a root, and a tip, the walls and the tip each including an interior surface that defines an interior with the root, the interior including an airfoil cooling circuit for directing airflow through the blade, and a platform supporting the airfoil and having a leading side edge, a trailing side edge, suction side edge, a pressure side edge, an airfoil-facing wall, and a root-facing wall, the platform including a platform cooling circuit having an inlet on the leading side edge and an outlet.

In still another embodiment, by way of example only, a turbine rotor assembly includes a rotor, a blade extending from the rotor, and a seal plate. The blade includes an airfoil defined by a convex suction side wall, a concave pressure side wall, a leading edge, a trailing edge, a root, and a tip, the walls and the tip each including an interior surface that defines an interior with the root, the interior including an airfoil cooling circuit for directing airflow through the blade, and a platform supporting the airfoil and having a leading side edge, a trailing side edge, suction side edge, a pressure side edge, an airfoil-facing wall, and a root-facing wall, the platform including a platform cooling circuit having a cooling air supply hole on the leading side edge of the platform, an inlet on the root-facing wall, and an outlet. The seal plate is disposed adjacent to the rotor to form a cool air cavity for directing cool air to the cooling hole.

BRIEF DESCRIPTION OF THE DRAWINGS

The inventive subject matter will hereinafter be described in conjunction with the following drawing figures, wherein like numerals denote like elements.

DETAILED DESCRIPTION

The following detailed description is merely exemplary in nature and is not intended to limit the inventive subject matter or the application and uses of the inventive subject matter.

Furthermore, there is no intention to be bound by any theory presented in the preceding background or the following detailed description.

A blade is provided that has improved platform cooling with minimal pressure loss. In an embodiment, the blade includes an airfoil defined by a convex suction side wall, a concave pressure side wall, a leading edge, a trailing edge, a root, and a tip, the walls and the tip each including an interior surface that defines an interior with the root, the interior including an airfoil cooling circuit for directing airflow through the blade, and a platform supporting the airfoil and having a leading side edge, a trailing side edge, suction side edge, a pressure side edge, an airfoil-facing wall, and a root-facing wall, the platform including a platform cooling circuit having an inlet on the leading side edge and an outlet. The outlet can be formed on one or more of the airfoil-facing wall, the pressure side edge, the suction side edge, and/or the trailing side edge.

Figure 1:
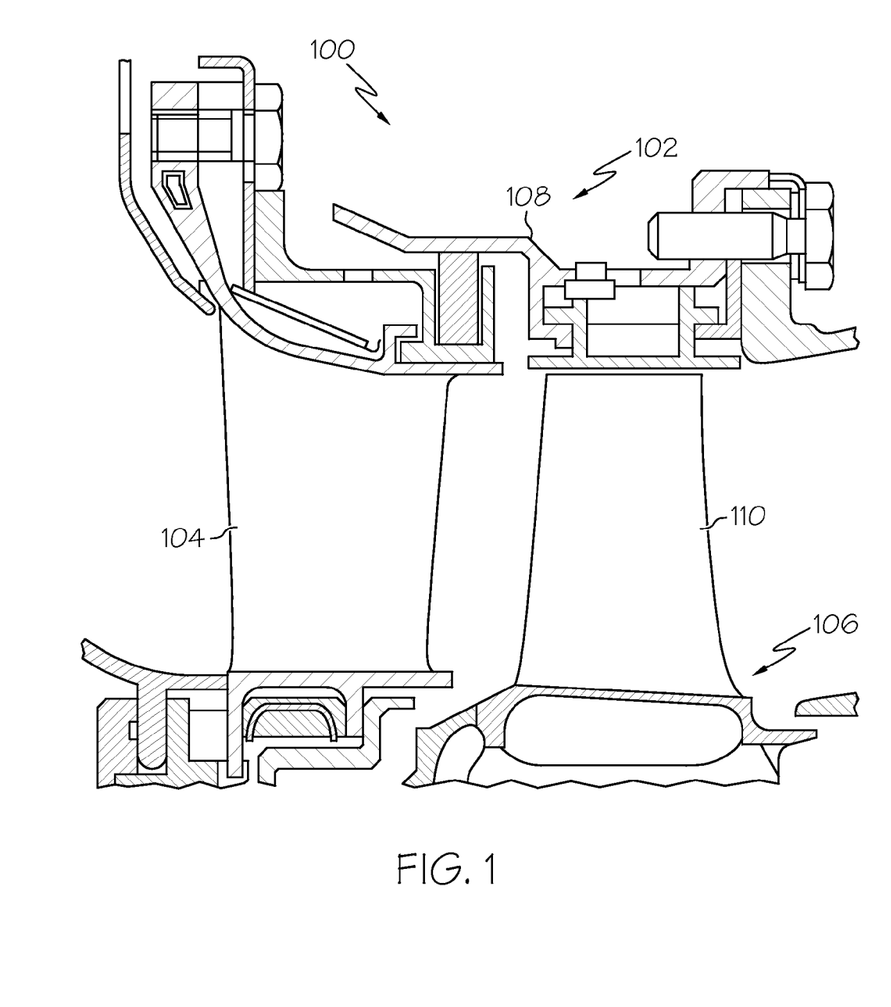
FIG. 1 is a partial cross-sectional side view of a high pressure turbine stage of an engine, according to an embodiment.

FIG. 1 is a partial cross-sectional side view of a high pressure turbine stage 102 of an engine 100, according to an embodiment. The high pressure turbine stage 102 includes a turbine stator 104 and a turbine rotor assembly 106, both surrounded by a shroud 108 defining a gas flow path through which hot, combusted air from an upstream compressor section (not shown) is directed. The turbine stator 104 directs the air toward the turbine rotor assembly 106. The air impinges upon blades 110 of the turbine rotor assembly 106, causing the turbine rotor assembly 106 to rotate.

Figure 2:
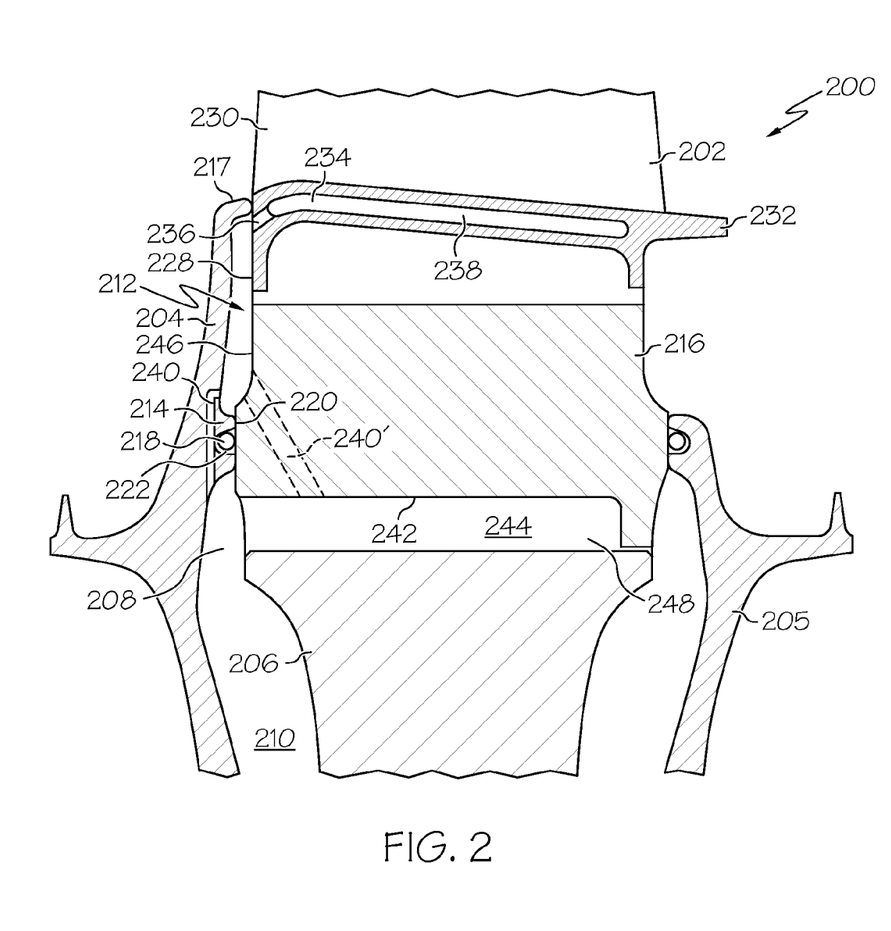
FIG. 2 close-up view of a portion of a turbine rotor assembly including a blade having a cooling system, according to an embodiment.

To allow the high pressure turbine stage 102 to operate as intended, certain components of the stage 102 are cooled. For example, the blades 110 of the turbine rotor assembly 106 include an internal cooling system. FIG. 2 is a close-up view of a portion of a turbine rotor assembly 200 including a blade 202 having a cooling system, according to an embodiment. The turbine rotor assembly 200 includes a forward seal plate 204, a turbine disk 206, blades 202 (only one of which is shown), and an aft seal plate 205, in an embodiment. The forward seal plate 204 is spaced apart from the turbine disk 206 to form a flow cavity 208. The flow cavity 208 is configured to be in flow communication with a cool air source (e.g., a compressor section, not shown). An annular sealing flange 214 divides the flow cavity 208 into an inner radial cavity 210 and an outer radial cavity 212.

The annular sealing flange 214 extends axially from the forward seal plate 204 and is configured to seal against a root 216 of a corresponding blade 202 in the turbine disk 206. In this regard, the annular sealing flange 214 is disposed radially inward from an outer diameter 217 of the forward seal plate 204. In an embodiment, the annular sealing flange 214 has a relatively flat sealing surface 220 for contacting the blade 202. The sealing flange 214 can include a sealing ring 218 formed in a suitably located groove 222 in the annular sealing flange 214 to improve sealing. The cool air from the flow cavity 208 is directed to the blade 202 to cool the blade 202.

The blade 202 includes an airfoil 230, a platform 232, and the root 216. The airfoil 230 is disposed over the platform 232, which includes a platform cooling circuit 234 formed therein. Generally, the platform cooling circuit 234 has an inlet 236 for receiving the cool air and channels 238 (one of which is depicted) for flowing the cool air through the platform 232. In an embodiment, the inlet 236 is formed on a leading side edge wall of the platform 228. To provide the outer radial cavity 212 with the cool air, a delivery channel 240 is formed through the forward seal plate 204. In an embodiment, the delivery channel 240 extends behind the groove 222 of the forward seal plate 204. Alternatively, as shown in phantom in FIG. 2, the delivery channel 240' is formed through the root 216, which is disposed in a blade slot 248 of the turbine disk 206. Because an inner radial surface 242 of the root 216 is spaced apart from the surface defining the blade slot 248 to form a flow channel 244, the delivery channel 240' can extend from the flow channel 244 to a leading side wall 246 of the root 216 and to flow cool air from the flow channel 244 into the outer radial cavity 212. Although a single delivery channel 240 is included in FIG. 2, a plurality of delivery channels 240 can be included at various locations around the annular sealing flange 214, in other embodiments. In such embodiments, the delivery channels 240 may be substantially evenly spaced around the annular sealing flange 214 or unevenly spaced.

Figure 3:
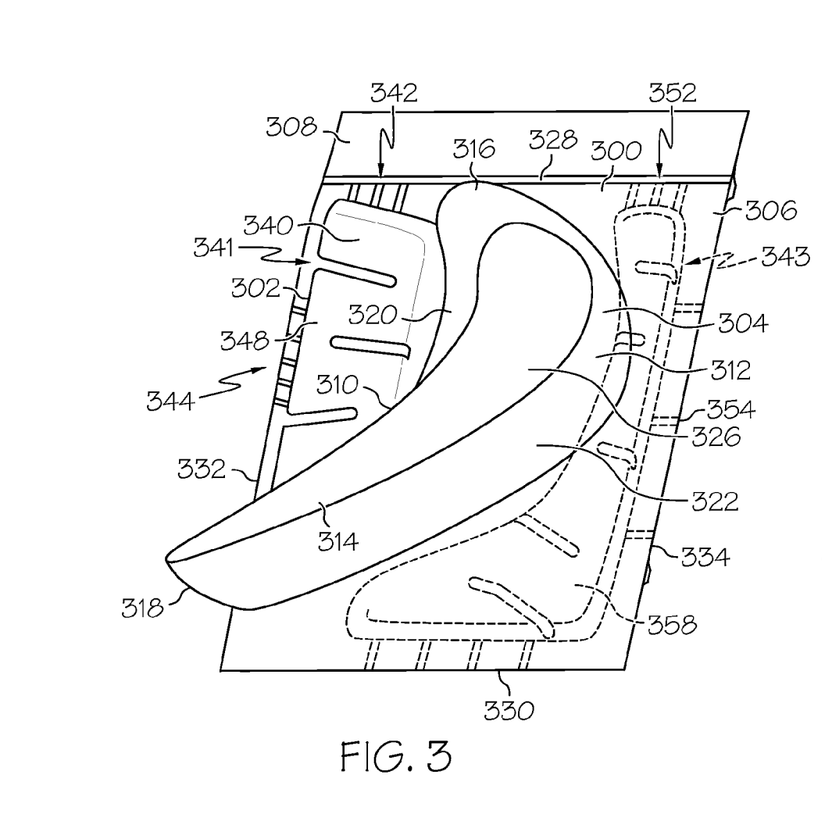
FIG. 3 is a reverse image of a top view of a blade including a platform cooling circuit; according to an embodiment.

FIG. 3 is a reverse image of a top view of a blade 300 including a platform cooling circuit 302 and an internal cooling circuit 326, according to an embodiment. The blade 300 includes an airfoil 304 and a platform 306. The airfoil 304 is generally made up of a concave, pressure side wall 310, a convex, suction side wall 312 opposite the concave, pressure side wall 310, and a tip wall 314 extending between and coupling the pressure sidewall 310 and the suction side wall 312 together. The walls 310, 312, 314 may each have varying thicknesses along their lengths. In an embodiment, the walls 310, 312, 314 may have thicknesses that range between about 0.2 mm and 3.0 mm. In still other embodiments, the walls 310, 312, 314 may each have equal thicknesses, while in other embodiments the walls 310, 312, 314 may not each have substantially equal thickness. In any case, the walls 310, 312, 314 have outer surfaces that together define an airfoil shape. The airfoil 304 is made up of a leading edge 316, a trailing edge 318, a pressure side 320 along the concave, pressure side wall 310, a suction side 322 along the convex, suction side wall 312. The walls 310, 312, 314 define an internal cooling circuit 326, which receives cool air through a root 308 and discharges the cool air out slots or openings (not shown) in the blade 300.

Figure 7:
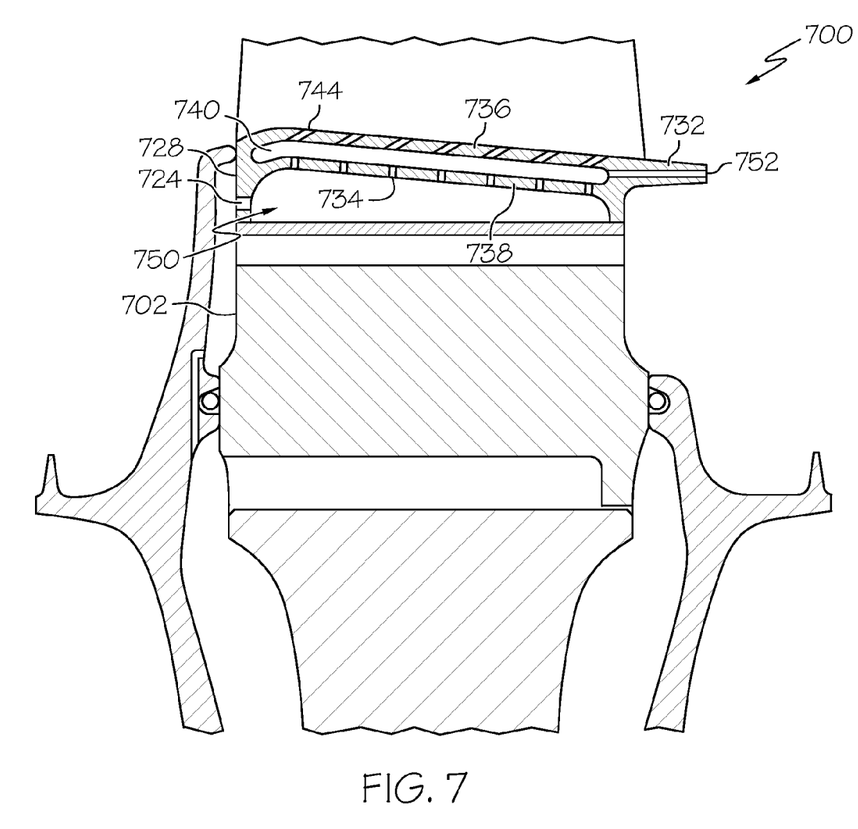
FIG. 7 is a close-up view of a portion of a turbine rotor assembly including a platform cooling circuit, according to still another embodiment.

The platform 306 supports the airfoil 304 and has a leading side edge 328, a trailing side edge 330, a pressure side edge 332, a suction side edge 334, an airfoil-facing wall 736 (shown in FIG. 7), and a root-facing wall 738 (shown in FIG. 7). A length measured from the leading side edge 328 to the trailing side edge 330 is greater than a length measured from the airfoil leading edge 316 to the airfoil trailing edge 318. In an embodiment, the length between the leading and trailing side edges 328, 330 is in a range of about 2 cm to about 5 cm, and the length between the airfoil leading and trailing side edges 316, 318 is in a range of about 1.9 cm to about 4.9 cm. In another embodiment, the lengths are greater or less than the aforementioned ranges. A width measured between the pressure and suction side edges 332, 334 is greater than a largest width measured between the pressure and suction side walls 310, 312. For example, the width measured between the suction and pressure side edges 332, 334 is in a range of about 1.5 cm to about 3 cm, and the largest width measured between the pressure and suction side walls 310, 312 is in a range of about 0.5 cm to about 2 cm. In another embodiment, the widths are greater or less than the aforementioned ranges.

The platform 306 includes a platform cooling circuit 340 configured to provide cool air to the platform 306. The platform cooling circuit 340 can include one or both of a pressure side platform cooling circuit 341 and/or a suction side cooling circuit 343 (shown in phantom). The pressure side platform cooling circuit 341 has a plurality of inlets 342 and outlets 344. The inlets 342 are formed on the leading side edge 328 of the platform 306 to be in communication with the outer radial cavity 212 (FIG. 2) to thereby receive cool air therefrom. Although three inlets 342 are illustrated, fewer or more can be included in other embodiments. Each inlet 342 has a circular flow area, in an embodiment. Alternatively, one or more inlet 342 has a different shape flow area. In another embodiment, all of the inlets 342 are substantially identically shaped. However, it will be appreciated that one or more of the inlets 342 can have a flow area that has a different shape than the others. In an embodiment, each inlet 342 has a largest diameter in a range of about 0.3 to about 1 mm. It will be appreciated, however that the inlets 342 can have larger or smaller largest diameters in other embodiments.

The pressure side platform cooling circuit 341 is independent from the internal cooling circuit 326 of the blade 300. The pressure side platform cooling circuit 341 generally comprises a channel 348 that extends from corresponding inlets 342 to corresponding outlets 344. The channel 348 comprises a serpentine channel, as depicted in FIG. 3. In still another embodiment, one or more of the channels 348 may or may not be connected and may have a curved shape or another shape.

As noted briefly above, the platform cooling circuit (e.g., circuit 340) can also or alternatively include the suction side cooling circuit (e.g., circuits 343, 443). The suction side cooling circuit 343 is configured to provide cool air to a platform 306 and has a plurality of inlets 352 and outlets 354. The inlets 352 are formed on a leading side edge 328 of the platform 306 to be in communication with the outer radial cavity 212 (FIG. 2) to thereby receive cool air therefrom. Although three inlets 352 are illustrated, fewer or more can be included in other embodiments. Each inlet 352 has a circular flow area, in an embodiment. Alternatively, one or more inlet 352 has a different shape flow area. In another embodiment, all of the inlets 352 are substantially identically shaped. However, it will be appreciated that one or more of the inlets 352 can have a flow area that has a different shape than the others. In an embodiment, each inlet 352 has a largest diameter in a range of about 0.3 to about 1 mm. It will be appreciated, however that the inlets 352 can have larger or smaller largest diameters in other embodiments.

The suction side cooling circuit 343 is independent from the internal cooling circuit 326 of the blade 300. The suction side cooling circuit 343 generally comprises a channel 358 that extends from corresponding inlets 352 to corresponding outlets 354. The channel 358 comprises a serpentine channel, as depicted in FIG. 3. In still another embodiment, one or more of the channels 358 may or may not be connected and may have a curved shape or another shape.

Figure 4:
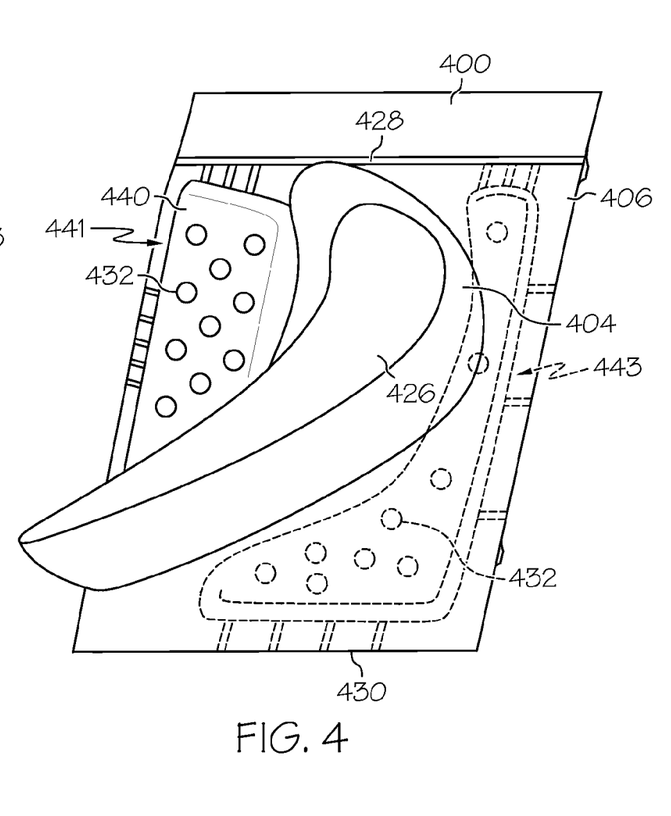
FIG. 4 is a reverse image of a top view of a blade including a platform cooling circuit; according to another embodiment.

FIG. 4 is a reverse image of a top view of a blade 400 including a platform cooling circuit 440 and an internal cooling circuit 426, according to another embodiment. The platform cooling circuit 440 can include one or both of a pressure and/or suction side platform cooling circuits 441, 443, although the suction side circuit 443 is depicted in phantom. The blade 400 includes an airfoil 404 and a platform 406, and the internal cooling circuit 426, airfoil 404, and platform are formed substantially similar to the internal cooling circuit 326, airfoil 304, and platform 306 of FIG. 3. The platform cooling circuits 441, 443 are formed as two or more channels that extend from a leading side edge 428 toward the trailing side edge 430 and includes a plurality of pin fins 432 extending through the channels. The pin fins 432 are included to serve as heat transfer elements to thereby improve cooling. Although the pin fins 432 are aligned in three rows, they can alternatively be disposed in a random pattern. In other embodiments, the pin fins 432 are not cylindrical and have a different shape. Moreover, although eighteen total pin fins 432 are included, more or fewer can be included for other embodiments.

Figure 5:
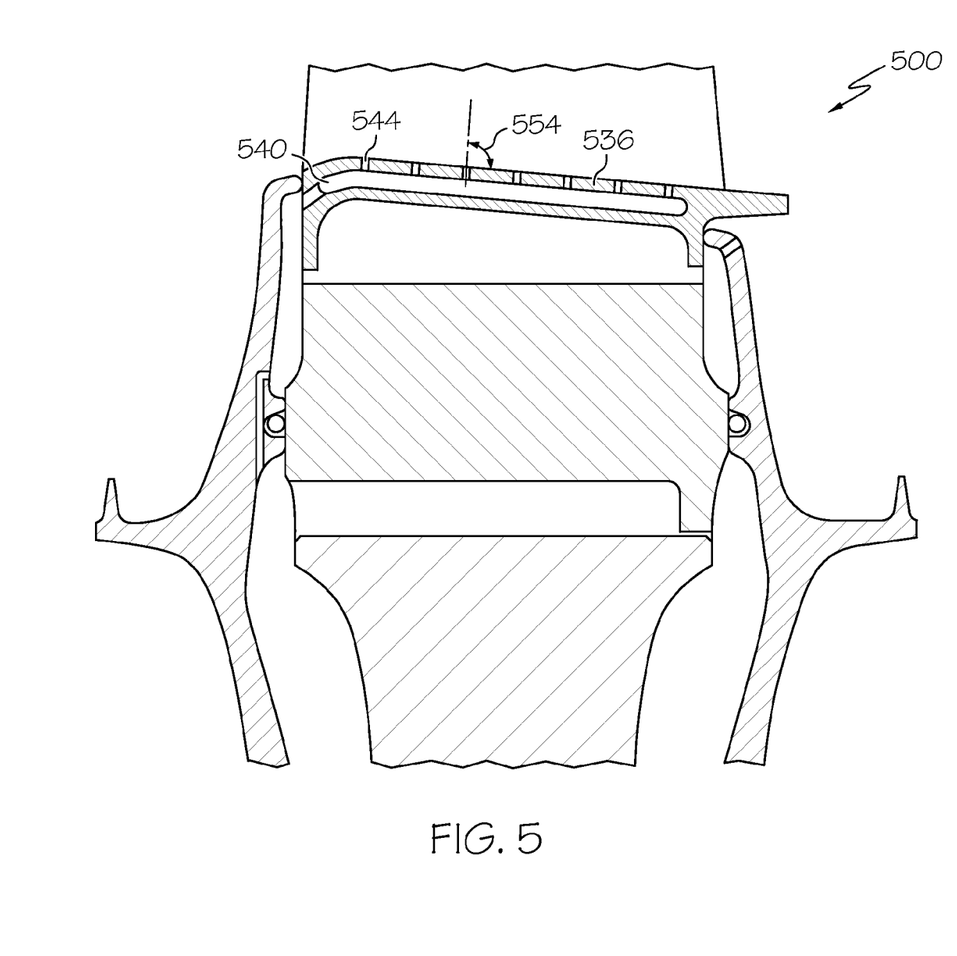
FIG. 5 is a close-up view of a portion of a turbine rotor assembly including a platform cooling circuit, according to an embodiment.

As noted above, the platform cooling circuits 340, 440 includes outlets 344. FIG. 5 is a close-up view of a portion of a turbine rotor assembly 500 including a blade having a platform cooling circuit 540, according to an embodiment. The outlets 544 extend through an airfoil-facing wall 536 to providing a cooling film for the wall 536. In an embodiment, each outlet 544 has a largest diameter in a range of about 0.3 to about 1 mm. In other embodiments, the outlets 544 can be larger or smaller than the aforementioned range. The outlets 544 are uniformly shaped, in an embodiment. In another embodiment, one or more of the outlets 544 have different shapes. For example, although depicted as generally cylindrically-shaped in FIG. 5, the outlets 544 can have a circular, ovular, triangular or other shape cross section. Seven outlets 544 are illustrated in FIG. 5, however it will be appreciated that more or fewer are included in other embodiments. For example, more than seven outlets 544 can be formed randomly over an entirety of the airfoil-facing wall 536. In other embodiments, the more than seven outlets 544 are aligned in two or more rows on the airfoil-facing wall 536. The outlets 544 are disposed at an angle 554 relative to a surface of the airfoil-facing wall 536. In an embodiment, the angle 554 at which the outlets 544 are disposed are in a range of about 25° to about 90°. As depicted in FIG. 5, the outlets 544 are substantially orthogonal to the surface of the airfoil-facing wall 536.

Figure 6:
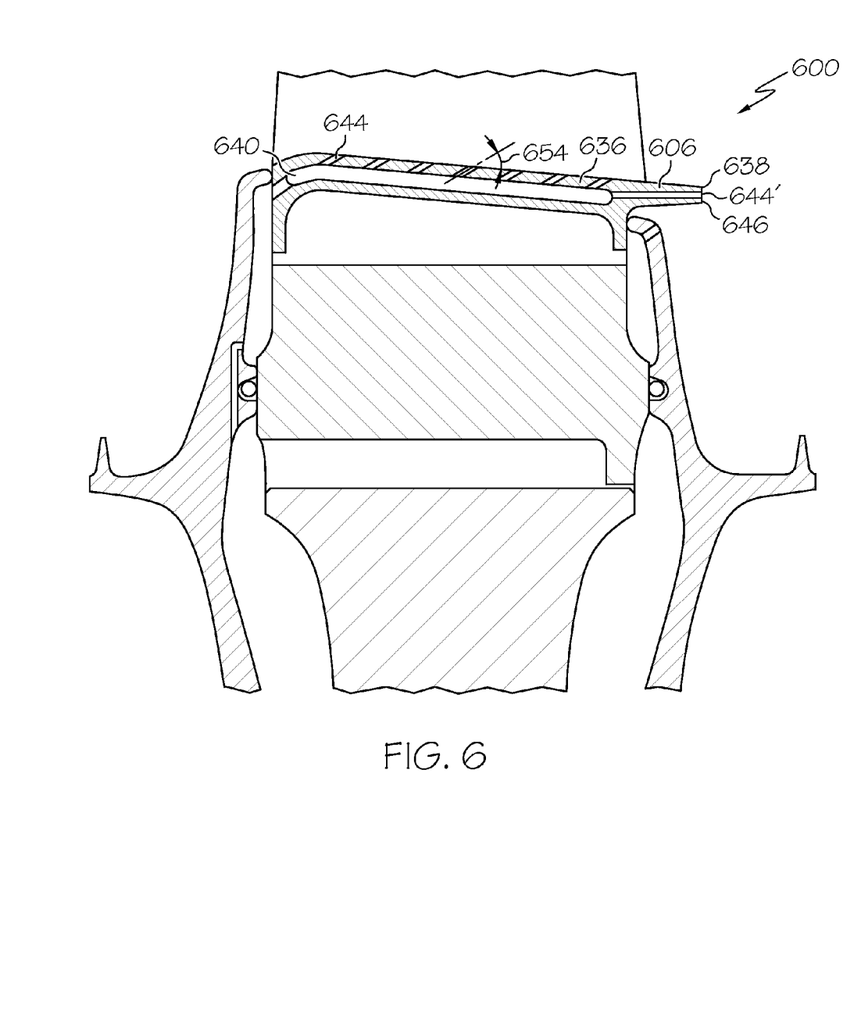
FIG. 6 is a close-up view of a portion of a turbine rotor assembly including a platform cooling circuit, according to another embodiment.

In other embodiments, the outlets 544 are disposed at a different angle. FIG. 6 is a close-up view of a portion of a turbine rotor assembly 600 including a blade having a platform cooling circuit 640, according to another embodiment. Here, outlets 644 are disposed at about a 45° angle 654 relative to a surface of an airfoil-facing wall 636.

In addition, or alternatively, to being disposed on the airfoil-facing wall 636, one or more of the outlets 644' can be formed through a trailing side edge 638 of a platform 606 so that the air in the platform cooling circuit 640 is expelled out an aft side 646 of the blade 600. Although a single outlet 644' is illustrated, more can be included. For example, between 1 to 10 outlets 644' can be formed on the trailing side edge 638. Each outlet 644' has a largest diameter in a range of about 0.3 to about 1 mm. In other embodiments, the outlets 644' can be larger or smaller than the aforementioned range. The outlets 644' are uniformly shaped, in an embodiment. In another embodiment, one or more of the outlets 644' have different shapes. For example, although depicted as generally cylindrically-shaped in FIG. 6, the outlets 644' can have a circular, ovular, triangular or other shape cross section.

FIG. 7 is a close-up view of a portion of a turbine rotor assembly 700 including a blade having a platform cooling circuit 740, according to still another embodiment. Here, the blade 702, platform cooling circuit 740, outlets 744 and airfoil-facing wall 736 are formed substantially similar to blade 602, circuit 640, outlets 644 and airfoil-facing wall 636 of FIG. 6, except that inlets 734 are formed through a root-facing wall 738 instead of the leading side edge wall. Additionally, cooling air supply holes 724 (only one of which is shown) are formed through a leading side edge wall 728 of a platform 732 so that cooling air can be supplied through holes 724 to the outer radial cavity 750 to supply flow to inlets 734. In an embodiment, each inlet 734 has a largest diameter in a range of about 0.3 to about 1 mm. In other embodiments, the inlets 734 can be larger or smaller than the aforementioned range. The inlets 734 are uniformly shaped, in an embodiment. In another embodiment, one or more of the inlets 734 have different shapes. For example, although depicted as generally cylindrically-shaped in FIG. 7, the inlets 734 can have a circular, ovular, triangular or other shape cross section. Seven inlets 734 are illustrated in FIG. 7, however it will be appreciated that more or fewer are included in other embodiments. For example, more than seven inlets 734 can be formed randomly over an entirety of the root-facing wall 738. In other embodiments, the more than seven inlets 734 are aligned in two or more rows on the root-facing wall 738. The inlets 734 are disposed at an angle relative to a surface of the root-facing wall 738. The inlets 734 are substantially orthogonal to the surface of the root-facing wall 738. In other embodiments, as depicted in FIG. 7, the angle at which the inlets 734 are disposed are in a range of about 45° to about 90°.

In embodiments in which the cooling air enters through the root-facing wall 738, the cooling air serves as impingement air to cool the blade platform 736. The air in the cooling cavity 740 then exits through an exit channel 752 or through platform cooling holes 744. Although a single exit channel 752 is illustrated, more or fewer may be included in other embodiments.

Although FIGS. 5-7 are depicted as being formed on a pressure side of a blade, it will be appreciated that any of the configurations and/or concepts included in FIGS. 5-7 alternatively or additionally can be implemented for a suction side of the blade.

Figure 8:
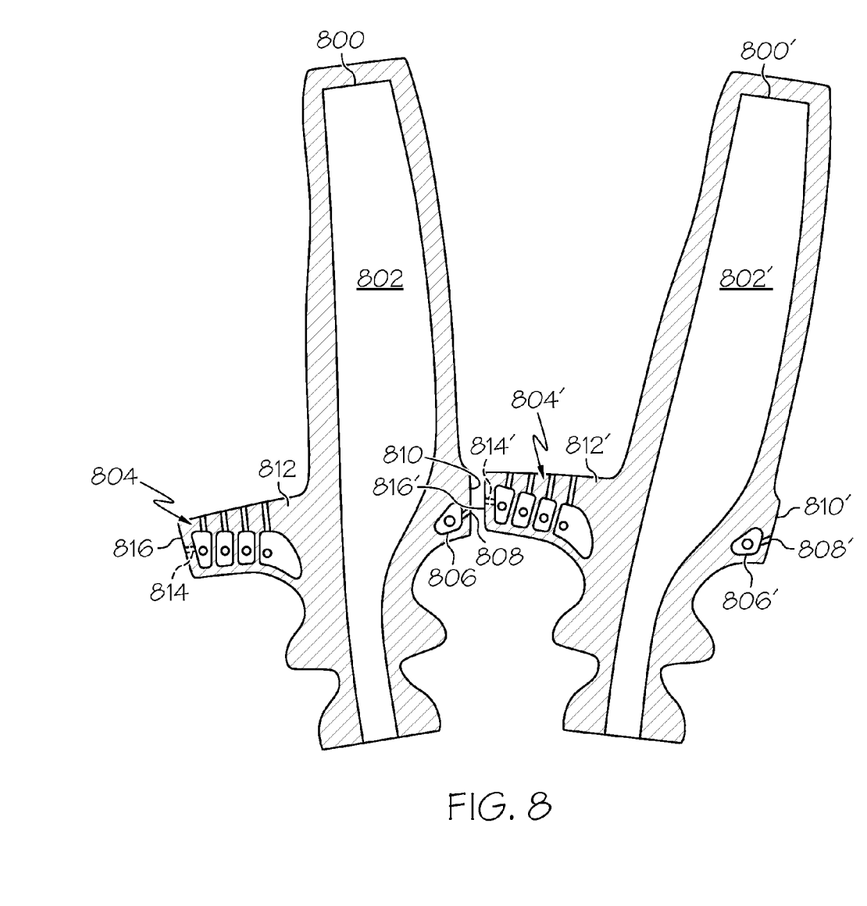
FIG. 8 is a cross section view of two adjacent blades, according to an embodiment.

FIG. 8 is a cross section view of two adjacent blades 800, 800', according to an embodiment. The blades 800, 800' each include an internal cooling circuit 802, 802', pressure side platform cooling circuits 804, 804', and suction side platform cooling circuits 806, 806'. The internal and pressure side platform cooling circuits 802, 802', 804, 804' are configured substantially similar to the internal cooling circuits 326, 426 (in FIGS. 3 and 4) and pressure side platform cooling circuits 340, 440, 540, 640, 740 (in FIGS. 3-7). The suction side platform cooling circuits 806, 806' are depicted in FIG. 8 as including an outlet 808, 808' through a suction side edge 810, 810' of a platform 812, 812'.

Although a single outlet 808, 808' is illustrated in FIG. 8 for each blade 800, 800', more can be included. For example, between 1 to 10 outlets 808, 808' can be formed on the suction side edge 810, 810'. Each outlet 808, 808' has a largest diameter in a range of about 0.3 to about 1 mm. In other embodiments, the outlets 808, 808' can be larger or smaller than the aforementioned range. The outlets 808, 808' are uniformly shaped, in an embodiment. In another embodiment, one or more of the outlets 808, 808' have different shapes. For example, although depicted as generally cylindrically-shaped in FIG. 8, the outlets 808, 808' can have a circular, ovular, triangular or other shape cross section.

Although FIG. 8 depicts the outlets 808, 808' of the suction side platform cooling circuits 806, 806' as being formed in the suction side edge 810, 810', it will be appreciated that outlets 814, 814' (depicted in phantom) of the pressure side platform cooling circuits 804, 804' can be formed through a pressure side edge 816, 816', in an embodiment. The outlets 808,808' and 814,814' may be utilized to cool the adjacent blade platform or may be directed out a platform aft side outlet (for example, an outlet similar to outlet 752 in FIG. 7)

In any case, during operation, cool air is directed from a cool air source, through a delivery channel, through supply holes and into the outer radial cavity. By including supply holes on the leading side edge and by forming the platform cooling circuit independent from the blade internal cooling circuit, cool air is directly bled from the cool air source and into the platform cooling circuit to maximize platform cooling. Additionally, by tailoring the location of the outlets on the airfoil-facing wall and/or the trailing side edge, cooling of the platform can be strategically accomplished.

While at least one exemplary embodiment has been presented in the foregoing detailed description of the inventive subject matter, it should be appreciated that a vast number of variations exist. It should also be appreciated that the exemplary embodiment or exemplary embodiments are only examples, and are not intended to limit the scope, applicability, or configuration of the inventive subject matter in any way. Rather, the foregoing detailed description will provide those skilled in the art with a convenient road map for implementing an exemplary embodiment of the inventive subject matter. It being understood that various changes may be made in the function and arrangement of elements described in an exemplary embodiment without departing from the scope of the inventive subject matter as set forth in the appended claims.

What is claimed is:

1. A turbine rotor assembly, comprising:
   a rotor;
   a blade extending from the rotor, the blade including:
      an airfoil defined by a convex suction side wall, a concave pressure side wall, a leading edge, a trailing edge, a root, and a tip, the walls and the tip each including an interior surface that defines an interior with the root, the interior including an airfoil cooling circuit for directing airflow through the blade, and
      a platform supporting the airfoil and having a leading side edge, a trailing side edge, a suction side edge, a pressure side edge, an airfoil-facing wall, and a root-facing wall, the platform including a platform cooling circuit independent from the airfoil cooling circuit and having an inlet on the leading side edge of the platform and an outlet, and
   a seal plate disposed adjacent to the rotor to form a cool air cavity for directing cool air to the inlet of the platform cooling circuit.

2. The turbine rotor assembly of claim 1, wherein the platform cooling circuit comprises a serpentine channel or a channel including pin fins extending therethrough.

3. The turbine rotor assembly of claim 1, wherein the outlet of the platform cooling circuit extends through the airfoil-facing wall of the platform.

4. The turbine rotor assembly of claim 3, wherein the outlet is disposed at an angle in a range of about 25° to about 90° relative to a surface of the airfoil-facing wall of the platform.

5. The turbine rotor assembly of claim 1, wherein the platform cooling circuit comprises a pressure side platform cooling circuit.

6. The turbine rotor assembly of claim 1, wherein the platform cooling circuit comprises a suction side platform cooling circuit.

7. The turbine rotor assembly of claim 1, wherein the outlet extends through the suction side edge of the platform.

8. The turbine rotor assembly of claim 1, wherein the outlet extends through the pressure side edge of the platform.

9. The turbine rotor assembly of claim 1, wherein the inlet extends through the root-facing wall of the platform.

10. The turbine rotor assembly of claim 9, further comprising an aft seal plate having a forward side and an aft side, the forward side disposed against the root of the airfoil.

11. The turbine rotor assembly of claim 1, wherein the outlet of the platform cooling circuit comprises a plurality of holes formed on the trailing side edge of the platform.

12. The turbine rotor assembly of claim 1, wherein:
   the rotor including a blade slot;
   the seal plate includes a sealing flange extending axially from the seal plate to contact the blade;

the root is disposed in the blade slot and forming a flow channel with a surface defining the blade slot, the root including a delivery channel extending from the flow channel to a leading side wall of the root, the delivery channel configured to flow cool air from the flow channel into a cavity formed between the seal plate and the leading side edge of the blade and into the inlet of the platform cooling circuit.

13. The turbine rotor assembly of claim 1, wherein:
the seal plate includes a sealing flange extending axially from the seal plate to contact the blade, and a cooling channel is formed through the sealing flange configured to flow cool air into a cavity formed between the seal plate and the leading side edge of the blade and into the inlet of the platform cooling circuit.

14. A turbine blade comprising:
an airfoil defined by a convex suction side wall, a concave pressure side wall, a leading edge, a trailing edge, a root, and a tip, the walls and the tip each including an interior surface that defines an interior with the root, the interior including an airfoil cooling circuit for directing airflow through the turbine blade; and
a platform supporting the airfoil and having a leading side edge, a trailing side edge, a suction side edge, a pressure side edge, an airfoil-facing wall, and a root-facing wall, the platform including a platform cooling circuit independent from the airfoil cooling circuit and having an inlet on the leading side edge of the platform and an outlet.

15. The turbine blade of claim 14, wherein the platform cooling circuit comprises a serpentine channel or a channel including pin fins extending through the channel.

16. The turbine blade of claim 14, wherein the outlet of the platform cooling circuit extends through one or more of the airfoil-facing wall of the platform and the trailing side edge of the platform.

17. The turbine blade of claim 14, wherein the inlet of the platform cooling circuit extends through the root-facing wall of the platform.

18. A turbine rotor assembly, comprising:
a rotor;
a blade extending from the rotor, the blade including:
an airfoil defined by a convex suction side wall, a concave pressure side wall, a leading edge, a trailing edge, a root, and a tip, the walls and the tip each including an interior surface that defines an interior with the root, the interior including an airfoil cooling circuit for directing airflow through the blade, and
a platform supporting the airfoil and having a leading side edge, a trailing side edge, a suction side edge, a pressure side edge, an airfoil-facing wall, and a root-facing wall, the platform including a platform cooling circuit independent from the airfoil cooling circuit and having a cooling air supply hole on the leading side edge of the platform, an inlet on the root-facing wall, and an outlet, and
a seal plate disposed adjacent to the rotor to form a cool air cavity for directing cool air to the cooling air supply hole.

19. The turbine rotor assembly of claim 18, wherein the inlet extends through the root-facing wall of the platform.

* * * * *